(12) United States Patent
Holman et al.

(10) Patent No.: US 8,743,705 B2
(45) Date of Patent: Jun. 3, 2014

(54) WIRELESS MESH NETWORK NODE TEST ARRAY

(75) Inventors: Travis S. Holman, Provo, UT (US);
Steven L. Minch, Pleasant Grove, UT (US); John P. Filoso, Pleasant Grove, UT (US); John Clark Roberts, Cedar Hills, UT (US); Paul A. Dahl, Pleasant Grove, UT (US); Michael L. Zarns, Medina, MN (US)

(73) Assignee: Digi International Inc., Minnetonka, MN (US)

( * ) Notice: Subject to any disclaimer, the term of this patent is extended or adjusted under 35 U.S.C. 154(b) by 193 days.

(21) Appl. No.: 13/206,890

(22) Filed: Aug. 10, 2011

(65) Prior Publication Data

US 2012/0039178 A1 Feb. 16, 2012

Related U.S. Application Data

(60) Provisional application No. 61/372,289, filed on Aug. 10, 2010.

(51) Int. Cl.
*H04L 12/26* (2006.01)

(52) U.S. Cl.
CPC .................................. *H04L 43/50* (2013.01)
USPC ........... 370/242; 370/247; 370/248; 370/251; 370/258

(58) Field of Classification Search
None
See application file for complete search history.

(56) References Cited

U.S. PATENT DOCUMENTS

| | | | |
|---|---|---|---|
| 7,231,330 B2 * | 6/2007 | Hernandez-Mondragon et al. | 703/2 |
| 7,317,681 B1 * | 1/2008 | Ben-Dvora et al. | 370/224 |
| 2005/0053008 A1 * | 3/2005 | Griesing et al. | 370/241 |
| 2005/0140209 A1 * | 6/2005 | Fehr | 307/9.1 |
| 2008/0261535 A1 * | 10/2008 | Weil et al. | 455/67.11 |
| 2010/0034210 A1 * | 2/2010 | Wageningen et al. | 370/407 |

* cited by examiner

*Primary Examiner* — Jeffrey M Rutkowski
*Assistant Examiner* — Hardikkumar Patel
(74) *Attorney, Agent, or Firm* — Fogg & Powers LLC

(57) ABSTRACT

A wireless mesh network test system comprises a plurality of mesh network nodes, each comprising an antenna connection. An antenna network couples the antenna connections of the plurality of nodes, and a plurality of attenuators are distributed in the antenna network such that the attenuators simulate distance between the wireless mesh network nodes.

16 Claims, 3 Drawing Sheets

WIRELESS MESH NETWORK NODE TEST ARRAY

CLAIM OF PRIORITY

This patent application claims the benefit of priority, under 35 U.S.C. §119(e), to U.S. Provisional Patent Application Ser. No. 61/372,289 entitled "WIRELESS MESH NETWORK NODE TEST ARRAY," filed on Aug. 10, 2010, which is hereby incorporated by reference herein in its entirety.

FIELD OF THE INVENTION

The invention relates generally to mesh networks, and more specifically in one embodiment to a wireless mesh network node test array.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network. Mesh networks are often controlled by a coordinator device, such as a line powered device that acts as an interface between the mesh network and the Internet.

Mesh networks are often large, comprising tens or hundreds of nodes spread out over a wide area. Although each network node is able to communicate with neighboring nodes, the nodes typically will not be able to communicate with more than several other nodes in a typical network.

Although this is sufficient to ensure reliable communication of mesh networks in typical operation, it makes complex mesh networks difficult to configure or test in constrained environments such as a development laboratory where each node may be within radio range of most other nodes in a mesh.

There exists a need to provide wireless mesh network technology that provides for easy configuration and testing of such complex networks.

SUMMARY

Some example embodiments of the invention comprise a wireless mesh network test system comprising a plurality of mesh network nodes, each node comprising an antenna connection. An antenna network couples the antenna connections of the plurality of nodes, and a plurality of attenuators are distributed in the antenna network such that the attenuators simulate distance between the wireless mesh network nodes.

DETAILED DESCRIPTION

Figure 1:
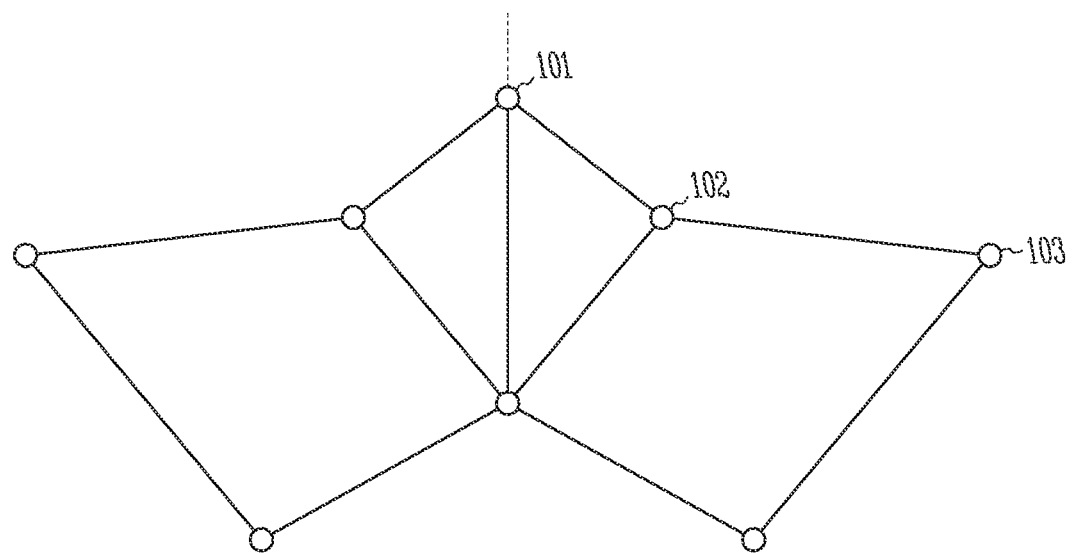
FIG. 1 shows an example wireless mesh network environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data long a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Nodes in some mesh networks can also conserve power by entering a sleep mode, or becoming inactive for extended periods of time when operation is not necessary. For example, a mesh network of ground moisture sensors may only need to take and report measurements every two hours, and need only be awake for a few milliseconds every two hour period. The sleeping nodes in such a network are desirably synchronized by the coordinator during configuration of the network so that they wake at the same time, enabling the nodes to communicate with each other while awake.

But, the more complex mesh networks become the more difficult it can be to troubleshoot problems with configuration or design of the network. Network nodes that are a part of very large networks, that sleep, or that have other characteristics commonly found in actual usage but not often used in a laboratory or testing environment can result in bugs that are difficult to find or fix.

One example embodiment of the invention therefore provides a mesh network array including a simulated wireless network space that restricts communication between mesh network nodes to a limited number of neighboring nodes, as would typically be the case in an actual field deployment, rather than permitting wireless communication between all nodes in a test assembly. This is achieved in one more detailed example by providing a connection network coupled to antenna connectors on a number of mesh network nodes located physically near each other, incorporating attenuators between nodes to simulate reduction in RF signal strength between nodes when deployed in a wider area.

FIG. 1 shows a simple mesh network, illustrating this problem. Here, coordinator node 101 is in communication with node 102 due to its proximity to node 102, but is too far away from node 103 to communicate directly with node 103. Communication between nodes 101 and 103 must therefore travel between an intermediate node such as node 102, resulting in at least one extra network hop, routing decisions, and other such differences in network operation.

If such a network is reconstructed in a laboratory by operating a group of 8 nodes in a test assembly, it is likely that the physical proximity of the nodes in the test assembly will result in each node being able to communicate directly with each other node, resulting in network behavior that is different from what actually occurs in the field when nodes are spaced more widely apart. Although the eight nodes in this example may be spread apart within a reasonable laboratory space to better simulate real-world operation, the nodes are then subject to interference from other laboratory equipment, lighting, and other environmental factors that may not resemble an actual deployment environment. Spreading nodes out in a laboratory environment also becomes impractical as hundreds or thousands of nodes are employed in a mesh network, as the space required can easily exceed the size of the space available.

Figure 2:
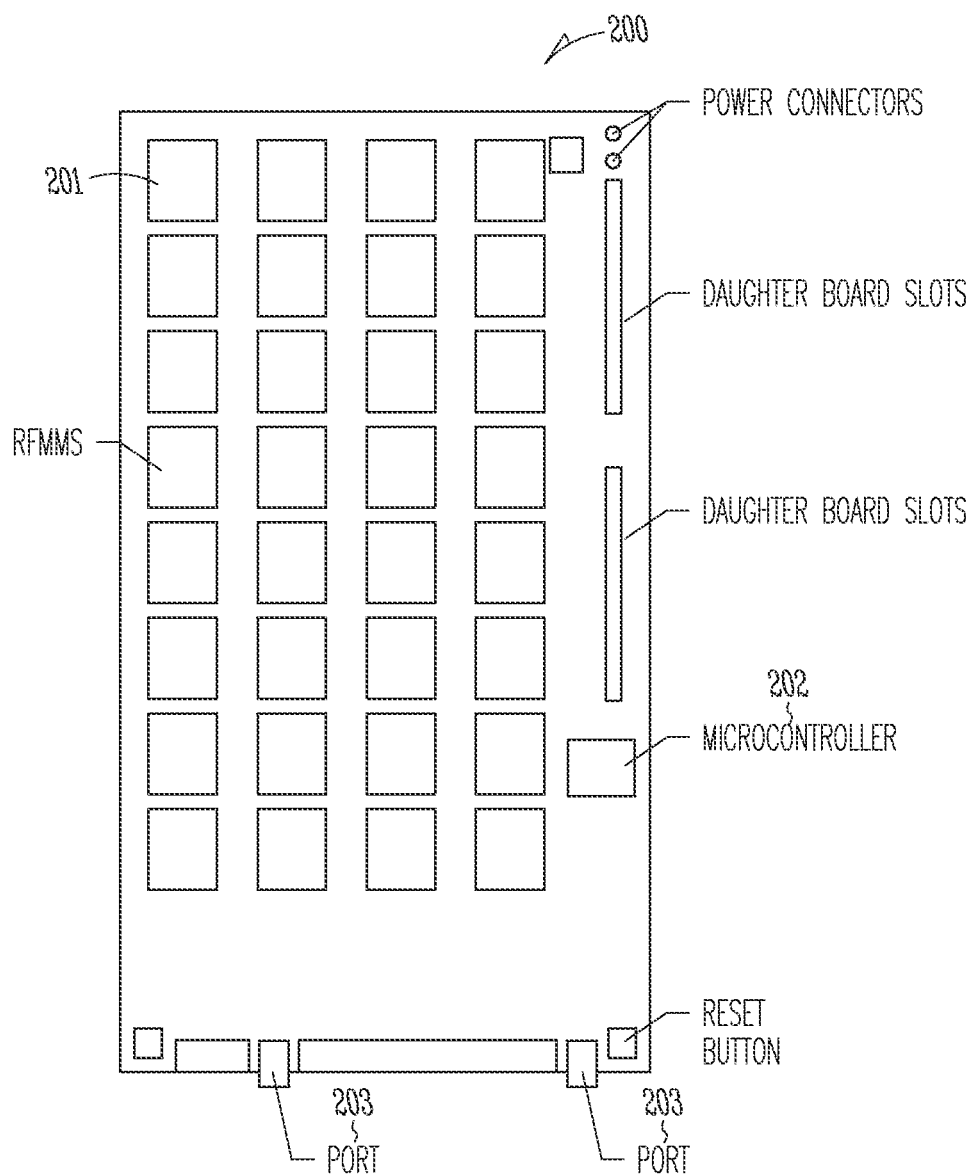
FIG. 2 shows an array of mesh network nodes coupled by a configurable antenna network, consistent with an example embodiment of the invention.

These problems are addressed in some embodiments by forming a network of antenna linkages and attenuators that couple the mesh network nodes together in a manner that simulates a typical deployment environment, such as where a network node may be able to communicate with only a few nearest neighbors within the network. FIG. 2 illustrates a circuit board assembly providing such a mesh network, consistent with an example embodiment of the invention.

Here, 1024 individual nodes are coupled to one another by using an assembly of 32 printed circuit boards, where each circuit board as shown at 200 comprises 32 individual mesh network nodes as shown at 201. In this particular example, the nodes within each row of four nodes are coupled to one another by coupling the antenna ports of the nodes together such that the nodes can communicate with one another. Each row of four nodes is connected to the neighboring row or rows by an attenuated network connection, which in a further embodiment is adjustable to simulate various network environments. Individual nodes on the board can be powered on or off, and attenuation between rows can be set via a microcontroller 202, which is coupled to a control system. Ports 203 are operable to connect the antenna network on the board to other boards, forming a test assembly having more than 32 nodes in the network.

Figure 3:
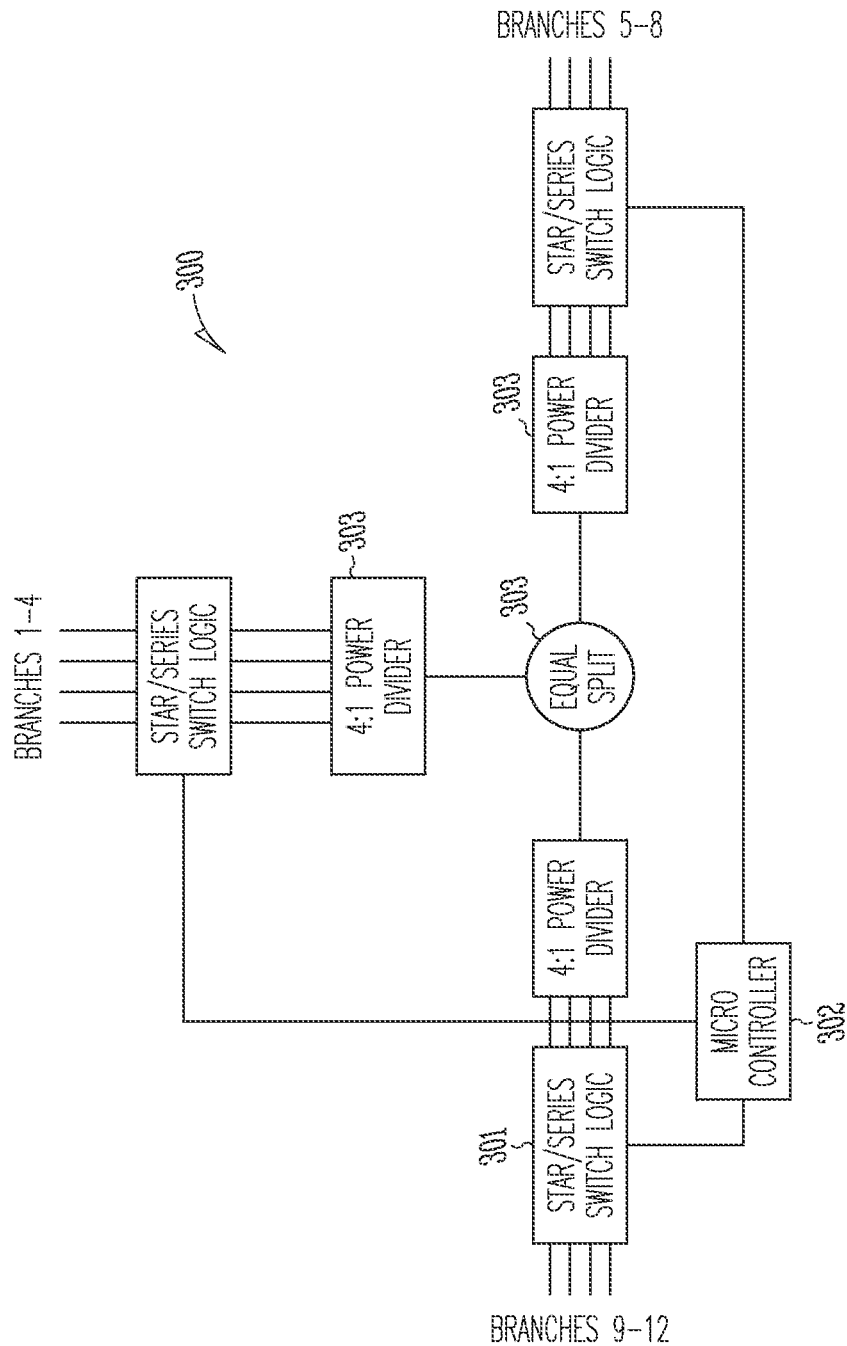
FIG. 3 shows an antenna network configuration board, consistent with an example embodiment of the invention.

In an alternate embodiment, ports 203 are coupled to a controller board such as shown at 300 of FIG. 3. The controller board 300 is operable to couple the ports of each board 200 in the test assembly to one another in various configurations, such as linking the boards serially or in a chain to simulate some types of operating environments, or linking the boards in a star configuration to simulate a more closely clustered mesh network environment. More specifically, the controller board 300 of FIG. 3 is configured to control 12 other boards such as board 200 of FIG. 2, and can link the individual boards in series or star configurations as reflected by the switch logic 301 coupled to microcontroller 302. The groups of four boards are further coupled to one another via a power divider network shown at 303, providing communication between each group of four boards or branches.

Although the configuration already described should enable a controller node in the mesh network to distribute information such as configuration settings to all other nodes in the network, serial ports on each node are further coupled to a central controller in some embodiments. This enables coupling each node to a configuration system, such as to speed up initial configuration, poll the status of nodes while under test, or to perform other such functions.

Distribution of serial connections to each node can be provided in a number of ways, but in some embodiments a Digi Serial Server Box™ (SSB) is employed to convert an Ethernet signal to 32 individually addressable serial signals. One SSB can therefore be used for each board as shown in FIG. 2, plus one or more additional serial connections coupling the microcontrollers on each board 202 and on the controller board 300 to a computer.

In this example, the 32 boards having 32 nodes each are combined in one or more racks or chassis, and under the control of a single controller board as shown n FIG. 3. The nodes are therefore closer than they could be if operated in the same network configuration without an antenna/attenuator network, such as within 1, 2, 5, or 10 meters of each other. In alternate embodiments, each rack or chassis may have its own controller, which communicates with a central controller or computer to coordinate operation of the mesh network. In a further embodiment, some RF shielding or isolation between boards 200 is provided, so that crosstalk between boards can be managed and will not permit communication between nodes on different boards or different areas of the same board except through the antenna connection network provided.

Although the topology presented here uses a configuration of nodes grouped into rows and boards to provide up to 1024 nodes in a single test system, other configurations are also useful and are within the scope of the invention. For example, multiple assemblies may be coupled to one another to provide test environments greater than 1024 nodes, or other logical or physical configurations of nodes may be provided to more accurately model different node deployment environments. For example, some nodes in FIG. 1 have only two connections to other nodes while other nodes have five, and it may be desirable to provide a test environment that more accurately models more complex configurations such as this.

The examples presented here illustrate how a mesh network can be formed in a laboratory or test environment using a network coupled to the antenna connections of each node and employing a series of attenuators, to better model a variety of large real-world mesh network deployments. The connection configuration of the nodes can be configured via a controller, as can the attenuation between various nodes or parts of the network. The mesh network can be scaled from a small network up to thousands of nodes very easily, and can be operated in a relatively small area without RF interference or space demands of a physical wide area deployment of mesh network nodes.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof. This application is intended to cover any adaptations or variations of the example embodiments of the invention described herein. It is intended that this invention be limited only by the claims, and the full scope of equivalents thereof.

What is claimed is:

1. A wireless mesh network test system, comprising:
    a plurality of mesh network nodes, each comprising an antenna connection;
    an antenna network coupling the antenna connections of the mesh network nodes;
    a plurality of attenuators distributed in the antenna network such that the attenuators simulate distance between the mesh network nodes; and
    a controller configured to selectively couple the mesh network nodes together to simulate a physical mesh network node configuration, wherein the physical mesh network node configuration is selected between a series configuration and a star configuration.

2. The wireless mesh network test system of claim 1, wherein the plurality of attenuators are configured in attenuation to simulate the physical mesh network node configuration.

3. The wireless mesh network test system of claim 1, wherein the antenna network is configured to simulate the physical mesh network node configuration.

4. The wireless mesh network test system of claim 1, wherein the plurality of mesh network nodes are within five meters of one another.

5. The wireless mesh network test system of claim 1, wherein two or more of the mesh network nodes are isolated from one another to restrict communication between the two or more mesh network nodes other than through the antenna network.

6. The wireless mesh network test system of claim 1, wherein the wireless mesh network test system is configured to include a selected number of mesh network nodes.

7. A method of operating a wireless mesh network test system, comprising:
    operating a plurality of mesh network nodes, each comprising an antenna connection coupling the mesh network node to an antenna network including a plurality of attenuators distributed in the antenna network such that the attenuators simulate distance between the mesh network nodes; and
    selectively coupling the mesh network nodes together using a controller to simulate a physical mesh network node configuration, wherein the physical mesh network node configuration is selected between a series configuration and a star configuration.

8. The method of operating a wireless mesh network test system of claim 7, further comprising configuring the plurality of attenuators to simulate the physical mesh network node configuration.

9. The method of operating a wireless mesh network test system of claim 7, further comprising configuring the antenna network to simulate the physical mesh network node configuration.

10. The method of operating a wireless mesh network test system of claim 7, wherein the plurality of mesh network nodes are within five meters of one another.

11. The method of operating a wireless mesh network test system of claim 7, wherein two or more of the mesh network nodes are isolated from one another to restrict communication between the two or more mesh network nodes other than through the antenna network.

12. The method of operating a wireless mesh network test system of claim 7, further comprising configuring the wireless mesh network test system to include a selected number of mesh network nodes.

13. A wireless mesh network test network, comprising:
    an antenna network configured to couple the antenna connections of a plurality of mesh network nodes; and
    a plurality of attenuators distributed in the antenna network such that the attenuators simulate distance between the mesh network nodes;
    wherein the antenna network or the attenuators are automatically configured using a controller to simulate a physical mesh network node configuration, wherein the physical mesh network node configuration is selected between a series configuration and a star configuration.

14. A wireless mesh network test system controller, comprising:
    a microcontroller;
    a plurality of switch logic circuits coupled to the microcontroller and configured to switch a plurality of mesh network nodes to simulate different physical mesh network node configurations, wherein the physical mesh network node configurations are selected between a series configuration and a star configuration; and
    a power divider network coupled to the switch logic circuits and configured to provide communication between the mesh network nodes;

wherein the microcontroller configures a plurality of attenuators distributed in an antenna network linking the mesh network nodes such that the attenuators simulate distance between the mesh network nodes.

15. The wireless mesh network test system controller of claim 14, wherein the microcontroller configures the antenna network to simulate the physical mesh network node configuration.

16. The wireless mesh network test system controller of claim 14, wherein the microcontroller configures the antenna network to include a selected number of the mesh network nodes.

\* \* \* \* \*